UNITED STATES PATENT OFFICE.

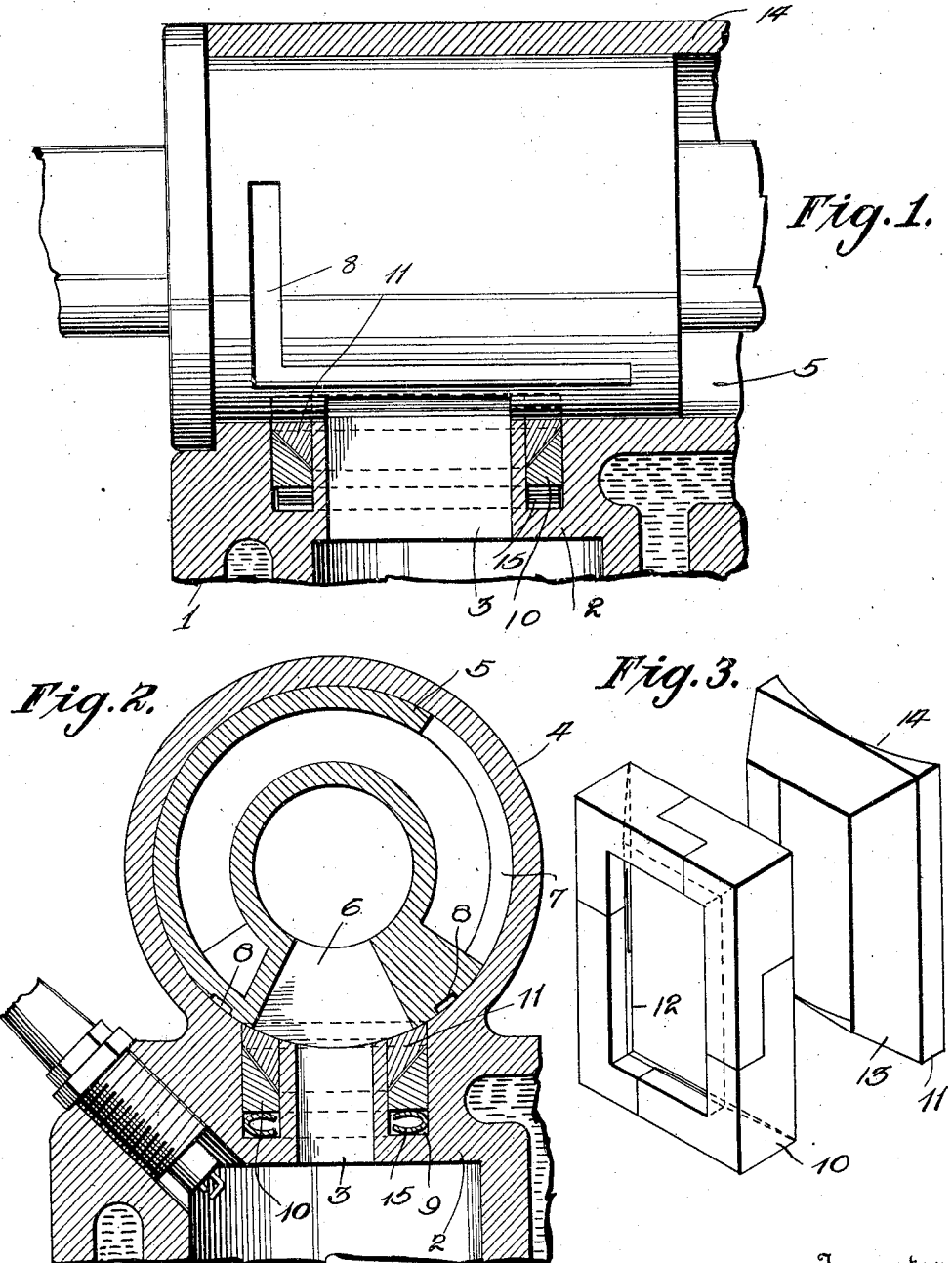

ALFRED MOLSTAD, OF LAWTON, IOWA.

ENGINE-VALVE PACKING.

1,363,894.  Specification of Letters Patent.  Patented Dec. 28, 1920.

Application filed December 6, 1919. Serial No. 342,898.

*To all whom it may concern:*

Be it known that I, ALFRED MOLSTAD, citizen of the United States, residing at Lawton, in the county of Woodbury and State of Iowa, have invented certain new and useful Improvements in an Engine-Valve Packing, of which the following is a specification.

My invention relates to new and useful improvements in an engine and more particularly to a packing adapted to be used in connection with an engine having a rotary valve.

The principal object of the invention resides in providing a packing, carried in the cylinder head, that is adapted to engage and form a tight joint around the rotary valve.

Another object of the invention consists in providing the cylinder head with a pocket adapted to receive the packing, said pocket having a spring received therein adapted to force the packing against the rotary valve.

A still further object consists in making the packing in sections so that certain of the sections may be replaced when they become worn.

With these and other objects in view my invention consists in the novel details of construction and arrangement of parts which will be more clearly understood from the following specification and drawings in which:—

Figure 1 is a longitudinal vertical section.

Fig. 2 is a transverse vertical section, and

Fig. 3 is a detailed perspective of the packing members.

In the drawings the numeral 1 indicates the engine cylinder having the usual head 2 formed integral therewith and provided with a passage 3 therethrough. A valve casing 4 is formed on top of the cylinder head and has a rotatable valve 5 mounted therein. This rotatable valve is provided with the inlet port 6 and the exhaust port 7 as more particularly illustrated in Fig. 2 of the drawings. Grooves 8 are formed in the valve for the reception of lubricating oil.

A circular recess or pocket 9 is formed around the opening or passage 3 and is adapted to receive my improved packing which is adapted to engage the rotatable valve and prevent leakage therearound. The packing is formed of two members indicated at 10 and 11 and the member 10 is interiorly beveled to form the female member whereas the member 11 is exteriorly beveled to form the male member. The bevel of the member 10 is indicated at 12 whereas the bevel of the member 11 is indicated at 13. The member 10 is formed of a plurality of sections cut as indicated more particularly in Fig. 3 of the drawings and adapted to be assembled to fit into the pocket or recess 9. The member 11 is concaved at the top as indicated at 14 so as to conform to the curvature of the outer face of the valve 5. A spring 15 is adapted to be received in the bottom of the recess or pocket 9 and bears against the underface of the packing member 10 so as to normally force the packing upwardly to form a tight fit around the valve.

From the above detailed description it is thought that my construction will be clearly understood as well as the advantages thereof. While my packing is primarily adapted for internal combustion engines it will be understood that it might equally as well be used in connection with a steam engine. By providing the packing in the cylinder head, engaging the rotatable valve, a tight joint is provided and prevents the leakage of gas or steam around the valve. The parts will be assembled in the position illustrated in Figs. 1 and 2 of the drawings the concaved portions 14 of the male member 11 engaging the outer face of the valve. The spring 15 will normally hold the packing up so as to tightly engage the valve.

The foregoing description and the drawings have reference to what may be considered the preferred, or approved, form of my invention. It is to be understood that I make such changes in construction and arrangement and combination of parts, materials, dimensions, etc. as may prove expedient and fall within the scope of the appended claim.

Having thus fully described my invention what I claim as new and desire to secure by Letters Patent is:—

In combination with an engine cylinder having a passage in the top and a recess formed around the passage, a rotatable valve mounted over the passage, a packing received in the recess and adapted to engage the valve, said packing comprising a sectional interiorly tapered female member and exteriorly tapered male member, and a spring adapted to be received in the recess and engaging the under surface of the female member for forcing the male member into contact with the valve.

In testimony whereof I affix my signature in presence of two witnesses.

ALFRED MOLSTAD.

Witnesses:
C. A. STILES,
SOPHIA LUDWIG.